(12) United States Patent
Chaney et al.

(10) Patent No.: US 7,188,599 B2
(45) Date of Patent: Mar. 13, 2007

(54) SUMP FOR COOLING PACKAGE AIR INTAKE HOUSING OF AN AGRICULTURAL MACHINE

(75) Inventors: Mark Michael Chaney, Geneseo, IL (US); Gary Stone Keys, II, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/178,681

(22) Filed: Jul. 11, 2005

(65) Prior Publication Data

US 2007/0006827 A1 Jan. 11, 2007

(51) Int. Cl.
F02B 77/04 (2006.01)
B01D 45/00 (2006.01)
B01D 46/00 (2006.01)

(52) U.S. Cl. .................. 123/198 E; 55/408; 55/432; 95/270; 95/277

(58) Field of Classification Search ............ 123/198 E; 55/406–408, 430, 432; 95/270, 277
See application file for complete search history.

(56) References Cited

U.S. PATENT DOCUMENTS

| | | | |
|---|---|---|---|
| 2,634,713 A | 4/1953 | Bartch et al. | |
| 2,845,140 A * | 7/1958 | Luhr | 55/484 |
| 3,299,226 A * | 1/1967 | Edwards | 200/16 C |
| 4,388,091 A * | 6/1983 | Khosropour | 55/337 |
| 4,514,201 A | 4/1985 | Brown | |
| 4,939,988 A * | 7/1990 | Wyatt et al. | 99/516 |
| 5,092,819 A * | 3/1992 | Schroeder et al. | 460/7 |
| 6,029,430 A | 2/2000 | Isfort et al. | |
| 6,193,772 B1 | 2/2001 | Wiefel | |
| 2004/0003578 A1 | 1/2004 | Twiefel | |

OTHER PUBLICATIONS

European Search Report, Oct. 2, 2006, 3 Pages.

* cited by examiner

*Primary Examiner*—Noah P. Kamen

(57) ABSTRACT

An apparatus is configured for supplying air to a cooling package for an internal combustion engine that powers an agricultural machine. The apparatus includes an air intake housing defining an air intake opening and a sump. The sump has a wall and a port. A gating device is positioned in communication with the port. The gating device has a first position wherein the port of the sump is closed and a second position wherein the port of the sump is not closed.

17 Claims, 5 Drawing Sheets

SUMP FOR COOLING PACKAGE AIR INTAKE HOUSING OF AN AGRICULTURAL MACHINE

FIELD OF THE INVENTION

The present invention relates to agricultural machines, and, more particularly, to a sump for a cooling package air intake housing of an agricultural machine.

BACKGROUND OF THE INVENTION

One type of agricultural machine is an agricultural combine. Agricultural combines are engine powered machines that harvest, thresh, separate and clean an agricultural crop. The resulting clean grain is stored in a grain tank located on the combine. The clean grain can then be transported from the grain tank to a truck, grain cart or other receiving bin by an unloading auger.

Such agricultural combines typically include a cooling package to remove heat from the coolant circulating through the engine powering the agricultural combine. The cooling package may include, for example, a housing mounting a radiator, and a rotary screen mounted on the air intake side of the radiator. Due to the presence of dust and chaff during operation of the agricultural combines, the rotary screen begins to collect the dust and chaff on the outer surface of the rotary screen. A vacuum duct is used to transfer the material, e.g., dust and chaff, off of the outer screen surface of the rotary screen during operation. The dust and chaff removed by the vacuum duct thus bypasses the cooling package via the vacuum duct and exits through the engine fan, which in turn safely returns to the surrounding air.

Other debris may be introduced in the region of the cooling package that have sufficient density and mass such that if the debris comes in contact with the fan blades of the engine fan, some of the debris may be propelled into the radiator and potentially damage the cooling fins of the radiator, or possibly penetrate the radiator core. For example, in some agricultural combine configurations, the cooling package may be in relatively close proximity to the grain tank. If during the operation of the agricultural combine the grain tank overflows, it is possible that some of the grain may be inadvertently introduced into the cooling package, and in turn be propelled by the fan as a projectile into the radiator.

SUMMARY OF THE INVENTION

The present invention provides an apparatus configured to substantially reduce the possibility that objects, such as grain, inadvertently introduced into the cooling package will reach the fan and be propelled into the radiator.

The invention, in one form thereof, is directed to an apparatus configured for supplying air to a cooling package for an internal combustion engine that powers an agricultural machine. The apparatus includes an air intake housing defining an air intake opening and a sump. The sump has a wall and a port. A gating device is positioned in communication with the port. The gating device has a first position wherein the port of the sump is closed and a second position wherein the port of the sump is not closed.

The invention, in another form thereof, is directed to an agricultural machine. The agricultural machine includes an engine, a fan rotatably coupled to the engine, and a cooling package in fluid communication with the engine. The cooling package includes a radiator having an air inlet and an air outlet. A fan shroud is mounted at the air outlet of the radiator. A rotary screen is mounted at the air inlet of the radiator. A vacuum duct has a vacuum opening and an exhaust opening, with the exhaust opening being connected to the fan shroud in fluid communication with the air outlet of the radiator and the vacuum opening being positioned adjacent the rotary screen. An air intake housing is coupled to the air inlet of the radiator and configured to channel air to the air inlet. The air intake housing defines an air intake opening and a sump. The sump is positioned at a level below a height of the vacuum opening of the vacuum duct. The sump has a wall and a port. A gating device is positioned in communication with the port. The gating device has a first position wherein the port of the sump is closed and a second position wherein the port of the sump is not closed.

The invention, in another form thereof, is directed to a method for manufacturing a cooling package air intake apparatus, including forming an air intake housing having an air intake opening and a sump; forming a port in the sump; and positioning a gating device in communication with the port, the gating device having a first position wherein the port of the sump is closed and a second position wherein the port of the sump is not closed.

DETAILED DESCRIPTION OF THE INVENTION

Figure 1:
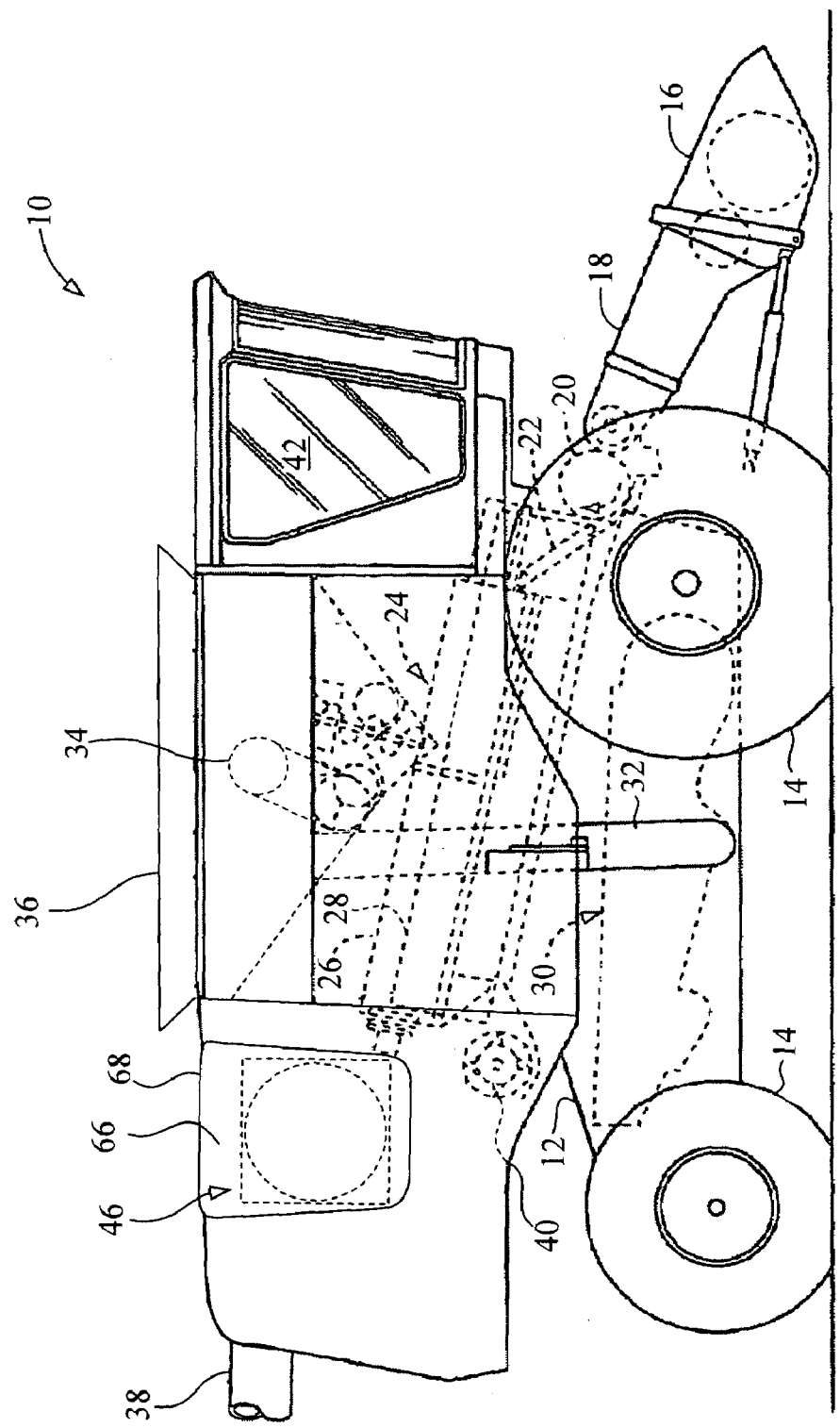
FIG. 1 is a diagrammatic side view of an agricultural machine, and in particular an agricultural combine, embodying the present invention.

FIG. 1 is a diagrammatic depiction of an agricultural machine 10. In the embodiment shown, agricultural machine 10 is in the form of an agricultural combine. Although the invention is being described as being incorporated into a combine, it is contemplated that the present invention may be used with other types of agricultural machines.

Agricultural machine 10, in the form of a combine, includes a supporting structure 12. A propulsion unit 14, which may include tires and/or tracks that engage the ground, is coupled to supporting structure 12, and performs propulsion and/or steering functions. A harvesting platform 16 is used for harvesting a crop and directing the crop to a feederhouse 18. The harvested crop is directed by feederhouse 18 to a beater 20. Beater 20 directs the harvested crop upwardly through an inlet transition section 22 to an axial crop processing unit 24.

Axial crop processing unit 24 is located between, and supported by the side sheets of agricultural machine 10. Axial crop processing unit 24 includes an axial rotor housing 26 and an axial rotor 28 located in axial rotor housing 26. The harvested crop enters axial rotor housing 26 through inlet transition section 22. Axial rotor 28 is provided with an infeed portion, a threshing portion and a separating portion.

Axial rotor housing 26 has a corresponding infeed section, a threshing section and a separating section.

Both crop processing portions, the threshing portion and the separating portion, are provided with crop engaging assemblies. The threshing section of the axial rotor housing 26 is provided with a concave and the separating section is provided with a grate. Grain and chaff released from the crop mat falls through the concave and the grate. The concave and grate prevent the passage of crop material larger than grain or chaff from entering a cleaning system 30.

Grain and chaff falling through the concave and grate is directed to cleaning system 30 which removes the chaff from the grain. The clean grain is then directed by a clean grain elevator 32 to a fountain auger 34. Fountain auger 34 directs the grain into a grain tank, or grain compartment, 36. The grain is removed from the grain tank 36 by an unloading auger 38.

As the crop residue, e.g., straw, stalks, chaff, dust, etc., reaches the end of the crop processing unit it is expelled through an outlet to a beater 40. Beater 40 propels the crop residue out the rear of the combine. The operation of agricultural machine 10 is controlled from the operator's cab 42.

Figure 2:
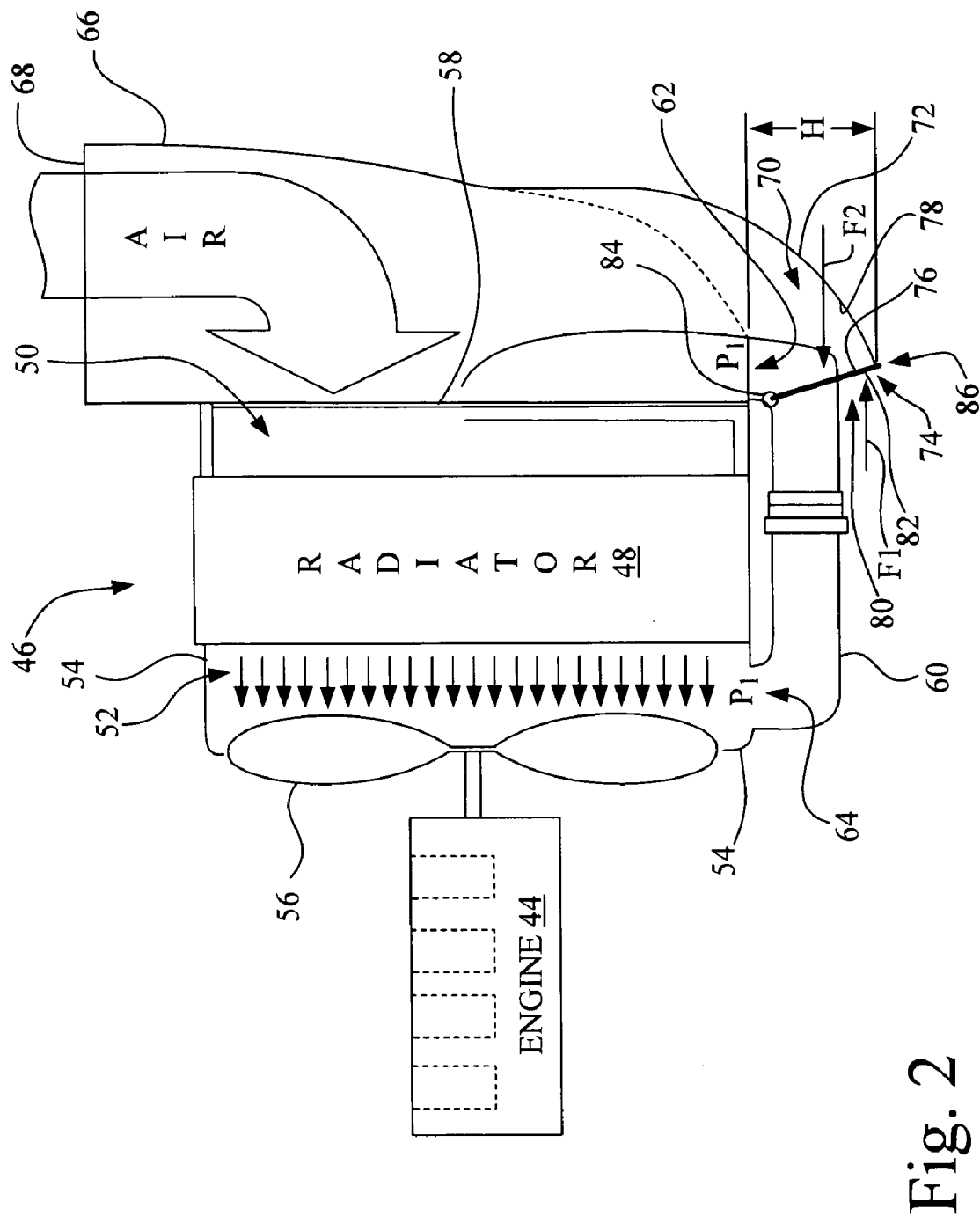
FIG. 2 is a schematic diagram of a cooling package air intake housing defining an air intake opening and a sump, with a gating device in a closed position.
Figure 3:
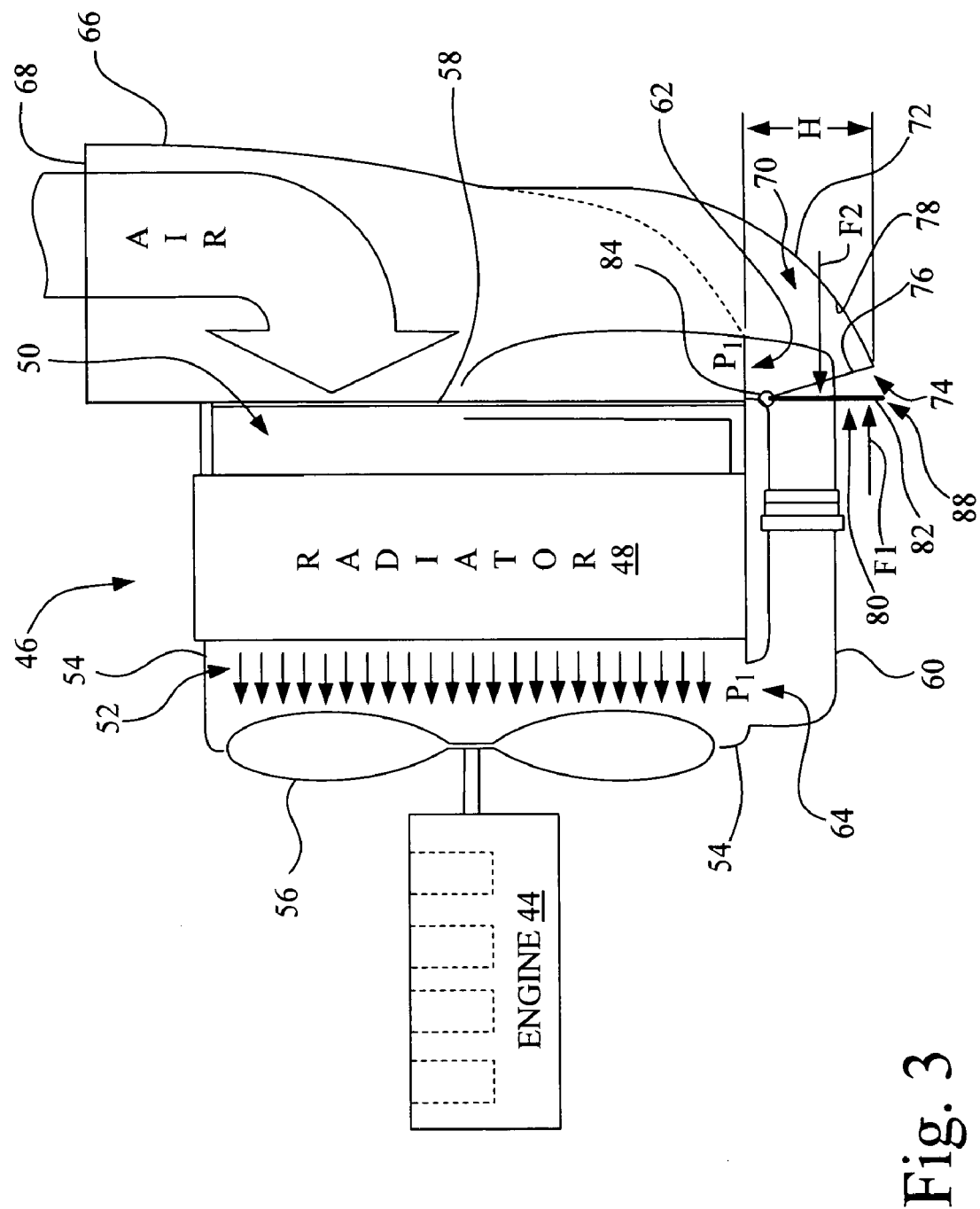
FIG. 3 is a schematic diagram of the cooling package air intake housing of FIG. 2, with the gating device in an open position.
Figure 4:
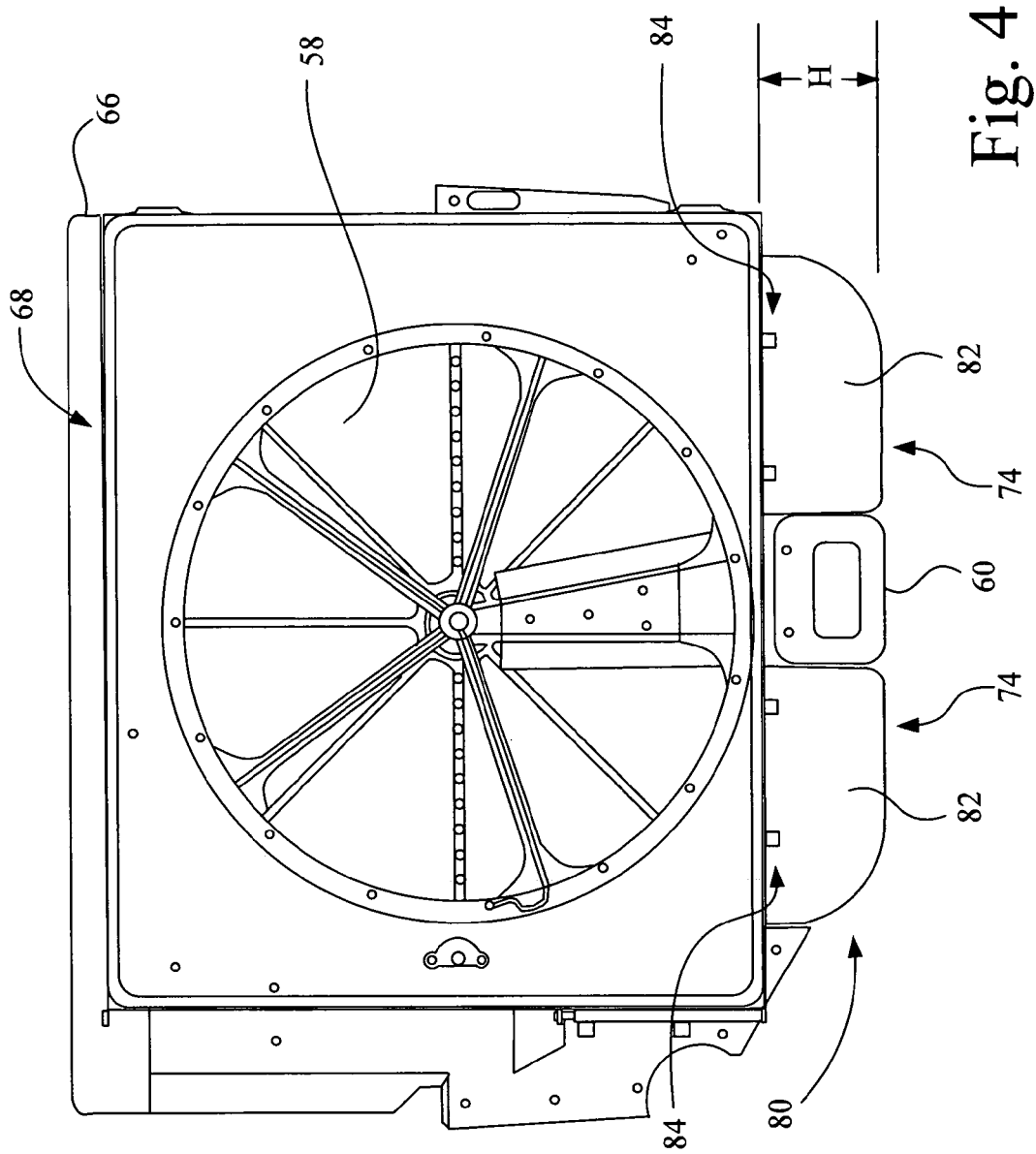
FIG. 4 is a rear view of the cooling package schematically illustrated in FIGS. 2 and 3.
Figure 5:
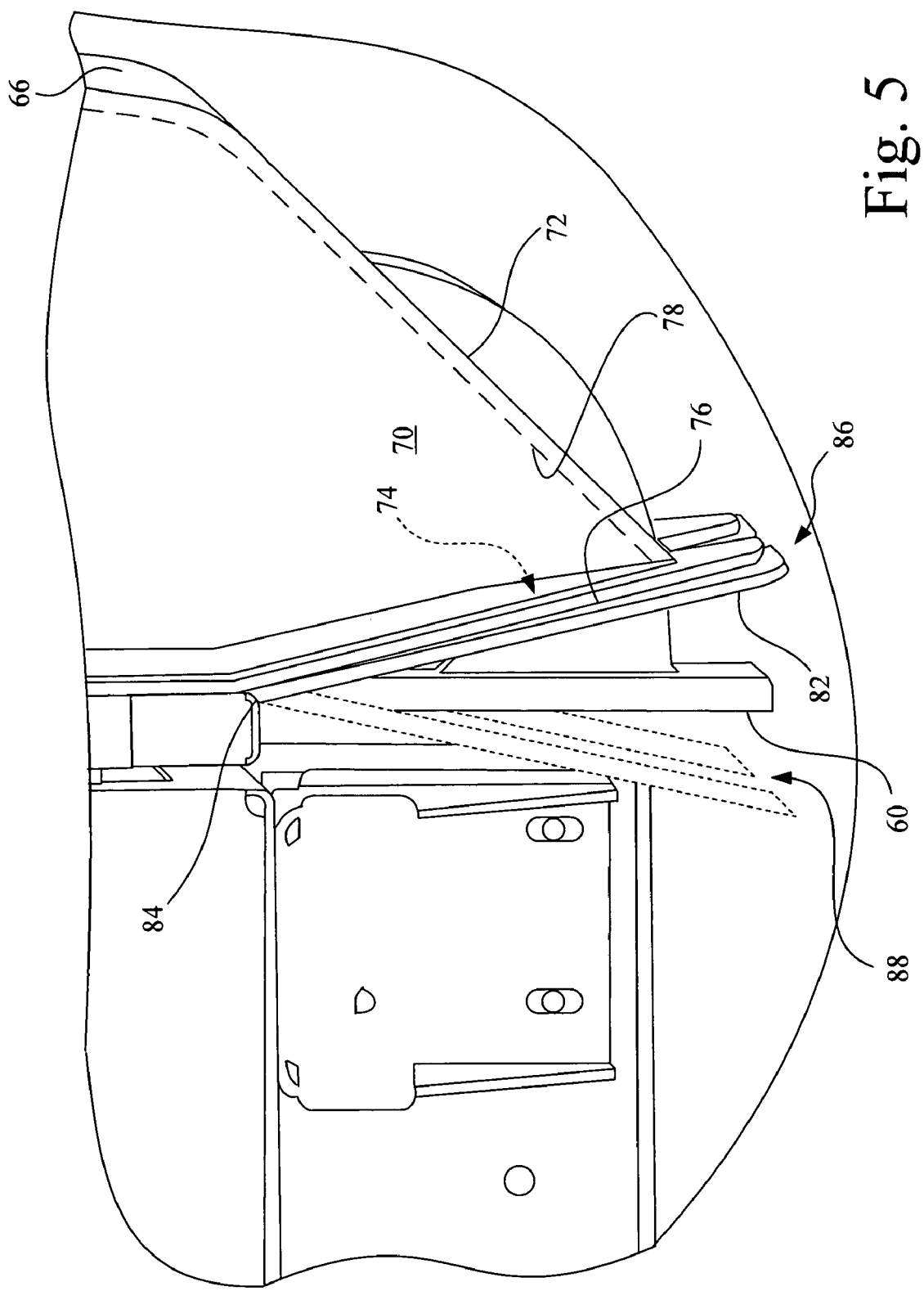
FIG. 5 is an enlarged side view of a portion of the cooling package of FIG. 4, showing the gating device in relation to the open position and the closed position.

Referring to the schematic diagrams of FIGS. 2 and 3, agricultural machine 10 includes an internal combustion engine 44 that provides the mechanical power needed to perform the propulsion and harvesting operations. Referring also to FIGS. 4 and 5, a cooling package 46 is provided in fluid communication with engine 44. Cooling package 46 includes a radiator 48 having an air inlet 50 and an air outlet 52. A fan shroud 54 is mounted at air outlet 52 of radiator 48. A fan 56 having a plurality of fan blades is rotatably coupled to engine 44, and positioned within an opening formed in fan shroud 54. A rotary screen 58 is mounted at air inlet 50 of radiator 48. A vacuum duct 60 having a vacuum opening 62 and an exhaust opening 64 is provided to assist in removal of dust and chaff from rotary screen 58. Exhaust opening 64 is connected to fan shroud 54 in fluid communication with air outlet 52 of radiator 48, and vacuum opening 62 is positioned adjacent rotary screen 58.

An air intake housing 66 is coupled to air inlet 50 of radiator 48 and configured to channel air to air inlet 50. The air drawn by fan 56 passes through the core of radiator 48 to air outlet 52, as represented by the plurality of short horizontal arrowed lines. A pressure P1 is established by the airflow past exhaust opening 64 of vacuum duct 60, and in turn, pressure P1, e.g., a negative pressure, is also present at vacuum opening 62 of vacuum duct 60.

Referring to FIGS. 2–4, air intake housing 66 defines an air intake opening 68 and a sump 70. Sump 70 is positioned at a level below a height (H) of vacuum opening 62 of vacuum duct 60. Sump 70 is defined by a perimetrical wall 72 and a port 74. Port 74 may be formed, for example, at an outer edge 76 of perimetrical wall 72, or alternatively, as an opening passing through perimetrical wall 72. As shown in FIGS. 2, 3 and 5, perimetrical wall 72 of sump 70 includes a slanted surface 78 leading to port 74.

Port 74 may have a single opening, or, as in the embodiment shown in FIG. 4, may include multiple openings, such as for example, wherein each of two openings are positioned on opposite sides of vacuum duct 60.

As shown in FIGS. 2–5, a gating device 80 is positioned in communication with port 74. Gating device 80 may be, for example, in the form of a flap 82, e.g., door, that is pivotally connected via a hinge arrangement 84 to air intake housing 66. In the embodiment of FIG. 4, for example, gating device 80 may include multiple flaps 82, such as for example, wherein each of the two flaps 82 are positioned on opposite sides of vacuum duct 60. As is best illustrated in FIGS. 2 and 5, gating device 80 has a first, e.g., closed, position 86 wherein port 74 of sump 70 is closed. As is best illustrated in FIGS. 3 and 5, gating device 80 has a second, e.g., open, position 88 wherein port 74 of sump 70 is not closed, i.e., is open.

In the embodiment shown in FIGS. 3 and 4, flap 82 is in a normally open position, until acted upon by a force to draw flap 82 to closed position 86, i.e., into contact with outer edge 76 of perimetrical wall 72, to cover, i.e., close, port 74 (see FIGS. 2 and 5). While reference is made to port 74 being closed, such a closed condition may, but need not, seal port 74, i.e., some residual air may flow through port 74 even when flap 82 is in closed position 86.

Referring to FIG. 2, a first force F1 exerted on gating device 80 holds gating device 80 in closed position 86. The first force F1 may be, for example, a negative pressure P1 introduced by vacuum duct 60 when engine 44 is running.

Referring to FIG. 3, gating device 80, e.g., flap 82, is changed from closed position 86 to open position 88 when a mass of debris collected in sump 70 exerts a second force F2 sufficient to overcome the first force F1 attempting to hold gating device 80 in closed position 86. For example, the debris collected in sump 70 may be formed, at least in significant part, by grain inadvertently introduced into air intake opening 68 of air intake housing 66 by grain spillage from grain tank 36. The second force F2 may be supplemented by a gravitational force exerted on gating device 80.

Sump 70 and gating device 80, e.g., flap 82, are designed and configured such that the second force F2 will overcome the first force F1 to open gating device 80 prior to a level of debris, i.e., grain, collected in sump 70 reaching a level in air intake housing 66 wherein the grain would reach the level (H) of vacuum opening 62 of vacuum duct 60. Accordingly, even when agricultural machine 10 is running, gating device 80 will open to drain grain inadvertently received in sump 70 prior to the grain reaching a level wherein the grain would be drawn by vacuum into vacuum opening 62 of vacuum duct 60, thereby substantially reducing the possibility that dense objects, such as grain, may be sucked into vacuum duct 60, and in turn, propelled by fan 56 as a projectile into radiator 48.

As an alternative to the preferred embodiment described herein with respect to FIGS. 2–5, gating device 80, e.g., flap 82, may be biased via a light spring (not shown) to a normally closed position, if desired. In this case, the force of the light spring would contribute to the force F1 that holds gating device 80 in closed position 86.

Having described the preferred embodiment, it will become apparent that various modifications can be made without departing from the scope of the invention as defined in the accompanying claims.

The invention claimed is:

1. An apparatus configured for supplying air to a cooling package for an internal combustion engine that powers an agricultural machine, wherein said cooling package includes a radiator having an air inlet and an air outlet, a rotary screen mounted at said air inlet of said radiator, and a vacuum duct having a vacuum opening and an exhaust opening, said vacuum opening being positioned adjacent said rotary screen, said apparatus comprising:

an air intake housing defining an air intake opening and a sump, said sump having a wall and a port;

a gating device positioned in communication with said port, said gating device having a first position wherein said port of said sump is closed and a second position wherein said port of said sump is not closed, wherein a first force exerted on said gating device holds said gating device in said first position, and said gating device is changed from said first position to said second position when a mass of debris collected in said sump exerts a second force that overcomes said first force holding said gating device in said first position; and said sump being positioned at a level below a height of said vacuum opening of said vacuum duct.

2. The apparatus of claim 1, wherein said debris is formed, at least in significant part, by grain inadvertently introduced into said air intake opening of said air intake housing.

3. The apparatus of claim 1, wherein said port includes two openings, each of said two openings being positioned on opposite sides of said vacuum duct.

4. The apparatus of claim 1, wherein said first force includes a negative pressure introduced by said vacuum duct when said engine is running.

5. The apparatus of claim 1, wherein said second force includes a gravitational force exerted on said gating device.

6. The apparatus of claim 1, wherein said gating device is a flap pivotally connected to said air intake housing, and wherein said flap covers said port when said flap is in said first position.

7. The apparatus of claim 1, wherein said agricultural machine is a combine.

8. An agricultural machine, comprising:

an engine;

a fan rotatably coupled to said engine;

a cooling package in fluid communication with said engine, said cooling package including a radiator having an air inlet and an air outlet, a fan shroud mounted at said air outlet of said radiator, a rotary screen mounted at said air inlet of said radiator, and a vacuum duct having a vacuum opening and an exhaust opening, said exhaust opening being connected to said fan shroud in fluid communication with said air outlet of said radiator and said vacuum opening being positioned adjacent said rotary screen;

an air intake housing coupled to said air inlet of said radiator and configured to channel air to said air inlet, said air intake housing defining an air intake opening and a sump, said sump being positioned at a level below a height of said vacuum opening of said vacuum duct, said sump having a wall and a port; and a gating device positioned in communication with said port, said gating device having a first position wherein said port of said sump is closed and a second position wherein said port of said sump is not closed.

9. The agricultural machine of claim 8, wherein a first force exerted on said gating device holds said gating device in said first position, and said gating device is changed from said first position to said second position when a mass of debris collected in said sump exerts a second force that overcomes said first force holding said gating device in said first position.

10. The agricultural machine of claim 9, wherein said debris is formed, at least in significant part, by grain inadvertently introduced into said air intake opening of said air intake housing.

11. The agricultural machine of claim 9, wherein said first force includes a negative pressure introduced by said vacuum duct when said engine is running.

12. The agricultural machine of claim 9, wherein said second force includes a gravitational force exerted on said gating device.

13. The agricultural machine of claim 8, wherein said gating device is a flap pivotally connected to said air intake housing, wherein said flap covers said port when said flap is in said first position.

14. The agricultural machine of claim 13, wherein a first force exerted on said flap holds said flap in said first position, and said flap is changed from said first position to said second position when a mass of debris collected in said sump exerts a second force on said flap that overcomes said first force holding said flap in said first position.

15. The agricultural machine of claim 14, wherein said debris is formed, at least in significant part, by grain inadvertently introduced into said air intake opening of said air intake housing.

16. The agricultural machine of claim 14, wherein said first force includes a negative pressure introduced by said vacuum duct when said engine is running.

17. The agricultural machine of claim 14, wherein said second force includes a gravitational force exerted on said flap.

* * * * *